(12) United States Patent
Gläser et al.

(10) Patent No.: US 12,172,651 B2
(45) Date of Patent: Dec. 24, 2024

(54) METHOD AND SYSTEM FOR EVALUATING A DRIVING BEHAVIOR

(71) Applicant: Volkswagen Aktiengesellschaft, Wolfsburg (DE)

(72) Inventors: Stefan Gläser, Braunschweig (DE);
Stephan Sorgatz, Magdeburg (DE);
Holger Poppe, Cremlingen (DE);
Hannes Rewald, Braunschweig (DE);
Julia Kwasny, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 215 days.

(21) Appl. No.: 17/856,170

(22) Filed: Jul. 1, 2022

(65) Prior Publication Data
US 2023/0001933 A1    Jan. 5, 2023

(30) Foreign Application Priority Data

Jul. 1, 2021  (DE) ...................... 10 2021 206 944.4

(51) Int. Cl.
*B60W 40/09*  (2012.01)
*B60W 40/02*  (2006.01)
*G06Q 10/0639*  (2023.01)
*G07C 5/08*  (2006.01)

(52) U.S. Cl.
CPC ............ *B60W 40/09* (2013.01); *B60W 40/02* (2013.01); *G06Q 10/06393* (2013.01); *G07C 5/0808* (2013.01); *B60W 2520/105* (2013.01); *B60W 2556/10* (2020.02)

(58) Field of Classification Search
None
See application file for complete search history.

(56) References Cited

U.S. PATENT DOCUMENTS

| | | |
|---|---|---|
| 8,996,290 B2 | 3/2015 | Robl et al. ................... 701/123 |
| 9,171,409 B2 | 10/2015 | Lee et al. |
| 9,650,051 B2 | 5/2017 | Hoye et al. |
| 10,696,306 B1 | 6/2020 | Benisch et al. |
| 10,831,207 B1 | 11/2020 | Leung et al. |

(Continued)

FOREIGN PATENT DOCUMENTS

| | | |
|---|---|---|
| DE | 102012216322 A1 | 3/2013 |
| DE | 102012021919 A1 | 5/2014 |

(Continued)

OTHER PUBLICATIONS

German Office Action, Application No. 102021206944.4, 7 pages, Dec. 2, 2021.

*Primary Examiner* — John F Mortell
(74) *Attorney, Agent, or Firm* — Slayden Grubert Beard PLLC

(57) ABSTRACT

The disclosure relates to a method for evaluating a driving behavior, wherein detected driving data of at least one human driver, or detected driving data of at least one automated driving vehicle are obtained, wherein a key performance indicator is determined based on the obtained driving data, wherein both a travel time as well as an energy efficiency and/or emissions efficiency are taken into account in determining the key performance indicator, wherein the determined key performance indicator is provided as an evaluation result.

19 Claims, 1 Drawing Sheet

(56) References Cited

U.S. PATENT DOCUMENTS

| | | | |
|---|---|---|---|
| 10,997,433 B2 | 5/2021 | Xu et al. | |
| 2013/0073129 A1 | 3/2013 | Martin et al. | 701/22 |
| 2018/0170393 A1 | 6/2018 | Decker et al. | |
| 2018/0354524 A1* | 12/2018 | Lindelöf | G06Q 10/06398 |
| 2021/0107499 A1 | 4/2021 | Brännström et al. | |
| 2022/0194446 A1* | 6/2022 | Akif | B61L 27/70 |

FOREIGN PATENT DOCUMENTS

| | | |
|---|---|---|
| DE | 102015213108 A1 | 12/2016 |
| DE | 102019105213 A1 | 9/2020 |
| EP | 3716196 A1 | 9/2020 |

* cited by examiner

METHOD AND SYSTEM FOR EVALUATING A DRIVING BEHAVIOR

CROSS-REFERENCE TO RELATED APPLICATIONS

This application claims priority to German Patent Application No. DE 10 2021 206 944.4, filed on Jul. 1, 2021 with the German Patent and Trademark Office. The contents of the aforesaid Patent Application are incorporated herein for all purposes.

TECHNICAL FIELD

The invention relates to a method and a system for evaluating a driving behavior.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

An automated driving vehicle is controlled by a central unit that entirely or partially takes over the driving tasks instead of a driver (Self Driving System, SDS). In this context, the SDS is intended to control the vehicle driving in an automated manner through traffic at least as efficiently (from the ego perspective) as an experienced human driver would if he were to manually control a comparable vehicle.

Required, therefore, are a method and a system that, on the one hand, determine how well a human driver would control a vehicle through the traffic in the form of a Key Performance Indicator (KPI). On the other hand, a method and a system that may review and evaluate a behavior of the automated driving vehicle controlled by the SDS are required.

SUMMARY

A need exists for an improved method and a system for evaluating a driving behavior. The need is addressed by a method and a system having the features of the independent claims. Embodiments of the invention are described in the dependent claims, the following description, and the drawings.

DESCRIPTION

Figure 1:
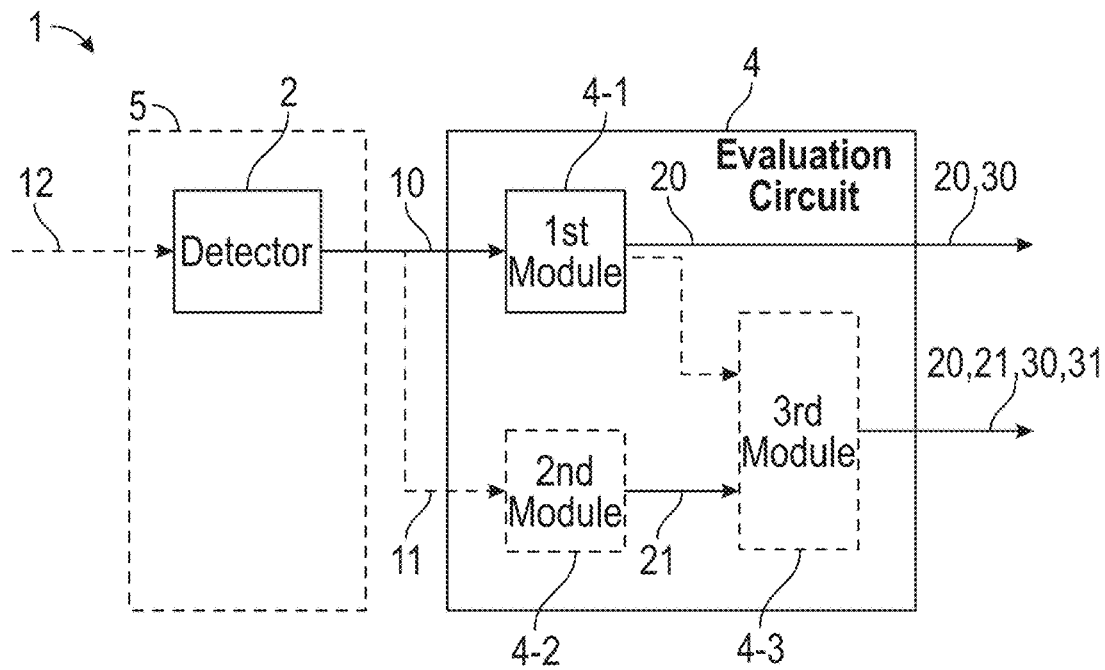
FIG. 1 shows a schematic representation of an embodiment of the system for evaluating a driving behavior.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for evaluating a driving behavior is provided, wherein detected driving data of at least one human driver, or detected driving data of at least one automated driving vehicle are obtained, wherein based on the received driving data, an key performance indicator is determined, wherein both a travel time as well as an energy efficiency and/or emissions efficiency are taken into account in determining the key performance indicator, wherein the determined key performance indicator is provided as an evaluation result.

Furthermore and in some embodiments, a system for evaluating a driving behavior is provided, comprising a detector and an evaluation circuit, wherein the detector is configured for detecting and/or receiving driving data of at least one human driver while driving a vehicle, or driving data of at least one automated driving vehicle while driving, wherein the evaluation circuit is configured for determining a key performance indicator based on the detected and/or received driving data, and to take into account while determining the key performance indicator both a travel time as well as an energy efficiency and/or emissions efficiency, and for providing the determined key performance indicator as an evaluation result.

The method and the system may make it possible to quantitatively evaluate a driving behavior of a human driver or of an automated driving vehicle based on detected driving data. For this purpose, driving data may be detected particularly on trips or respectively in situations in which the automated driving vehicle is in control, i.e., in which an action executed by the automated driving vehicle affects a subsequent situation. Furthermore, driving data may be detected of at least one human driver who manually controls a vehicle (comparable with regard to the properties) on trip routes. In some embodiments, driving data from a plurality of human drivers may be detected, and used within the scope of the method. A key performance indicator may be determined based on the received driving data of the at least one human driver, or the received driving data of the at least one automated driving vehicle. In determining the key performance indicator, both a travel time as well as an energy efficiency and/or emissions efficiency may be taken into account. In this context, the energy efficiency refers to an efficiency in energy conversion ("energy consumption"). In this context, the emissions efficiency refers particularly to an efficiency in the emission of pollutants, particularly of carbon dioxide and/or fine particulate (e.g., caused by combustion residues and/or abrasion). The determined key performance indicator is provided as an evaluation result, for example as an analog or digital signal, for example as a digital data packet.

A benefit of the method and of the system may be that both a travel time as well as an energy efficiency and/or emissions efficiency are taken into account during the evaluation.

Another benefit of the method and of the system may be that a driving behavior of an automated driving vehicle may be evaluated in relation to a travel time and an energy efficiency and/or emissions efficiency under real use conditions, i.e., while the automated driving vehicle has full control over a situation occurrence.

The driving data in some embodiments comprise a travel time, a driven route, and values of a longitudinal acceleration. The route or respectively trip route may be divided into route segments or trip route segments with associated travel times. The driving data are detected particularly on a plurality of trip routes.

In this disclosure, the evaluation of a driving behavior of an automated driving vehicle refers in some embodiments to an evaluation of a driving behavior of a control and/or regulation system of the automated driving vehicle, which may also be referred to as a Self Driving System (SDS), and generally comprises a central controller (processor). In the interests of simplicity, however, only the term automated driving vehicle is used in the scope of this disclosure.

A vehicle is for example a motor vehicle. However, in principle, the vehicle may be another land, rail, water, air or space vehicle, such as an air taxi or a drone.

In some embodiments, an operational domain is an Operational Design Domain (ODD). In this context, the operational domain refers to a type of an environment through which the vehicle must be controlled. The operational domain may relate to the following properties, for example: a type of road, an average speed, a presence or absence of traffic lights, a traffic density, a type and a number of other traffic participants (e.g., taxis, buses, trucks, etc.), a time of day, a day of the week, a season, a storm, a region, a country, etc. Furthermore, a type and a number of obstacles and/or situations to complete (e.g., intersection, left turn, right turn, change lanes, pass, etc.) may also be taken into account. An operational domain in some embodiments forms a type of reference territory or reference environment that is selected particularly as representative for continually recurring territories, environments, and/or data domains of the vehicle.

Parts of the system, for example the detector and/or the evaluation circuit, may be formed individually or collectively as a combination of hardware and software, for example as program code that is executed on a microcontroller or microprocessor. However, it is also possible for the parts to be designed individually or collectively as an application-specific integrated circuit (ASIC) and/or field-programmable gate array (FPGA). The term 'processor' is used in the following collectively for the aforesaid options.

In some embodiments, it is provided that for the driving data of at least one human driver and/or for driving data of at least one automated driving vehicle, determined key performance indicators are compared to one another, for example in pairs, wherein a comparison result is provided as an evaluation result. Determined key performance indicators may thereby be compared to one another, so that for example a driving behavior of an automated driving vehicle (or respectively of the SDS) may be compared to a driving behavior of a human driver and/or to a driving behavior of another automated driving vehicle (or respectively of the SDS). In this context, it may for example be provided that the driving behavior of at least one human driver is used, wherein it is for example intended that an automated driving vehicle drives at least as well as the at least one human driver, for example, in relation to the key performance indicator, for example in relation to a travel time and an energy efficiency and/or emissions efficiency.

In this context, it is not necessary for the driving data on which the comparison is based of the at least one human driver and/or of the at least one automated driving vehicle to be detected on the same trip routes, but rather may also originate from different trip routes. For example, the environments and situations in which the driving data are detected (or were detected), however, must be comparable to one another, i.e., they must have been detected in the same operational (design) domain in order to lend validity to the comparative result.

In some embodiments, it is provided that the key performance indicator is determined for various operational domains, and respectively provided as an evaluation result dependent of the operational domain. Thereby a driving behavior may be evaluated in dependence of the operational domain. Similar to how it is usual with regard to information about fuel consumption of vehicles, this allows differentiation based on operational domains, for example, evaluating the driving behavior in the following operational domains: city, country and "combined" or rural road, highway, city.

In some embodiments, it is provided that a sum of travel times of all trip routes taken into account is used as a measure for the travel time. This makes it possible for example to evaluate the driving behavior over longer routes and independently of a specific traveled route. For example, the sum may be normalized so that even travel times for routes of differing length may be compared to one another. For example, the travel time may be taken into account by means of the following expression:

$$\frac{L}{T \cdot |R|} \sum_{r \in R} \frac{t_r}{l_r}$$

where:
L a total length of all referenced trip routes r,
T a total travel time for completing all referenced trip routes r,
R a quantity of all referenced trip routes r,
|R| a number of the referenced trip routes r,
r a trip route from the quantity of all referenced trip routes R,
$t_r$ a travel time required for completing the trip route r,
$l_r$ a length of the trip route r.

The prefactor serves for normalization, so that the expression may only assume values between 0 and 1.

In some embodiments, it is provided that a sum of all positive longitudinal accelerations on all trip routes taken into account is used as a measure for the energy efficiency and/or emissions efficiency. An energy efficiency and/or emissions efficiency may thereby be taken into account in a simple manner, since frequent and significant acceleration in the longitudinal direction converts more energy and/or produces more emissions (pollutants) as less frequent and less significant acceleration. This sum may also be normalized. For example, the energy efficiency and/or emissions efficiency may be taken into account by means of the following expression:

$$\frac{T}{L \cdot |R|} \sum_{r \in R} \sum_{t=0}^{t_r} \max(a_r(t), 0) \Delta t$$

where (aside from the previously introduced values):
$a_r(t)$ a measured acceleration figure at time point t,
$\Delta t$ a time interval in which a measured value is detected (measurement period).

The prefactor serves for normalization, so that the expression may only assume values between 0 and 1.

In some embodiments, it is provided that the travel time and the energy efficiency and/or emissions efficiency is weighted when taken into account for determining the key performance indicator. A weight of the respective portions may be changed thereby. This may take place based on individual preferences, for example. It may be provided, for example, that different weighting categories are used for evaluation, and an evaluation result is provided for the selected weighting categories, respectively. Thus, the weighting may be different for a driver (or a passenger) with a preference for a sport driving style than for a driver (or passenger) with a preference for a smoother driving style.

Using the preceding expressions for the travel time and energy efficiency, the following results for the key performance indicator $I_{\mathit{eff}}$ particularly:

$$I_{\mathit{eff}} = w \cdot \frac{L}{T \cdot |R|} \sum_{r \in R} \frac{t_r}{l_r} + (1-w) \cdot \frac{T}{L \cdot |R|} \sum_{r \in R} \sum_{t=0}^{t_r} \max(a_r(t), 0) \Delta t$$

where w is a weighting factor from the interval [0, 1]. Due to the normalization, a resulting value for $I_{\mathit{eff}}$ is between 0 and 1, wherein a value of 0 means "good" and a value of 1 means "bad" (a reversed representation may also be selected in principle). The key performance indicator $I_{\mathit{eff}}$ provides a metric for an efficiency of the driving behavior from the ego perspective of the vehicle, i.e., an influence of the behavior of the vehicle (whether controlled manually or automatically) on the environment, and for example on other traffic participants, is not taken into account and therefore is not included in the evaluation.

In some embodiments, it is provided that the detected driving data, at least in part, are provided based on driving data recorded during at least one historical real trip of at least one human driver. Historical driving data may thereby be taken into account and made useful in determining the key performance indicator. Such historical driving data may also be derived from (enriched) road maps, for example. They usually contain not only static attributes, such as a maximum speed or a number of lanes, but rather additionally also speed profiles, as the case may be, e.g., floating car data (typically depending on day and time of day, or respectively resolved according to day and time of day). Based on these data, for example, an actual travel time for a road segment or trip route segment may be determined. An average speed may be determined based on the actual travel time and a length of an associated segment. A change of speed relative to the next segment may be used to determine an average acceleration.

In some embodiments, it is provided that the driving data, at least in part, are detected during a real trip of at least one human driver and/or an automated driving vehicle. Driving data may thereby be detected in real occurring situations, and made useful for determining the key performance indicators. The driving data may also be evaluated for subsequent simulations, to collect and/or determine true-to-reality parameters for the simulation. During a real trip, for example framework conditions are qualitatively registered: a traffic density, a type and a number of traffic participants, as well as additional potential disruptive influences. In parallel thereto, a length of each trip route taken (or segment thereof) into account is determined, and a travel time required for it is detected (measured). Similarly, values of a longitudinal acceleration are detected at regular time intervals. It may be for example provided that real trips are performed by a pool of drivers, to obtain driving data for an averaged human driving behavior in this manner. For this purpose, the drivers are or will be selected such that they are representative for a subsequent user group of the automated driving vehicle.

In some embodiments, it is provided that the driving data, at least in part, are detected during a simulation trip of the at least one human driver and/or the automated driving vehicle. An effort may be thereby reduced for detecting the driving data as well as for the driving data of the at least one human driver as well as for the driving data of the automated driving vehicle, since the same routes may be driven through multiple times in simulation without great effort, for example. Moreover, situations that only rarely occur in reality may also be simulated. The simulation trips may be performed particularly based on parameter values that were determined within the scope of performed real trips and/or based on recorded driving data. It may be provided, for example, that the simulation is generated based on detected driving data and/or recorded driving data, for example, in that parameters (course of the route, traffic density, etc.) of simulated situations along a simulated route are determined based on these detected and/or recorded driving data. Here also, a pool of human drivers may be provided to obtain driving data for an averaged human driving behavior in this manner. For this purpose, the drivers may be particularly selected such that they are representative for a subsequent user group of the automated driving vehicle. The simulated trips are performed particularly in operational domains that are representative for a subsequent application region of the automated driving vehicle.

Depending on how the input data of the automated driving vehicle have to be provided to perform the simulation trips, the following options result: If the automated driving vehicle (i.e., the SDS) is expecting object lists from an environment model as input information, it is sufficient in the scope of the simulation to emulate a time change of entries of the environment model about the respective trip route to be completed based on the recorded environment model information from the real trips. If the automated driving vehicle (i.e., the SDS) is expecting sensor data as input signals, because a sensor data fusion is performed for an internal environment model, for example, the sensor data must be emulated based on the real trips. The automated driving vehicle (i.e., the SDS) completes the trip routes in the simulator. A number of the trips is ideally selected so that they are statistically representative. The length of each route is identified during these trips and a travel time respectively required for it is detected (measured) or determined. Similarly, values of a longitudinal acceleration are determined at periodical time intervals. To make the values thus detected and/or determined plausible, they should be compared with the respective values from the real trips. The simulation parameters may also be adjusted, if applicable.

In some embodiments, it is provided that a drive comfort is additionally taken into account in determining the key performance indicator. The drive comfort may thereby be represented in the key performance indicator and used for evaluation of the driving behavior of the at least one human driver and/or of the automated driving vehicle. A comfort may also be determined, for example, additionally or alternatively to a longitudinal acceleration, based on a transverse acceleration, since generally the experienced comfort is that much greater, the lower a transverse acceleration is. The travel time, the energy efficiency, and/or emissions efficiency, and the comfort, are particularly taken into account as weighted. This makes it possible to individually set a respective influence on the key performance indicators.

In the following, the invention is explained in greater detail based on further exemplary embodiments and with reference to the FIGS.

Specific references to components, process steps, and other elements are not intended to be limiting. Further, it is understood that like parts bear the same or similar reference numerals when referring to alternate FIGS.

FIG. 1 shows a schematic representation of an embodiment of the system 1 for evaluating a driving behavior. The system 1 comprises a detector 2 and an evaluation circuit 4. The method described in this disclosure is explained in more detail in the following based on the system 1.

The detector 2 and the evaluation circuit 4 may be designed separately or collectively as a combination of hardware and software, for example as program code which is executed on a processor, such as for example a microcontroller or microprocessor. The detector 2 may be disposed in a manually controllable vehicle or an automated driving vehicle.

The detector 2 is configured to detect and/or obtain vehicle data 10 of at least one human driver while driving a vehicle, or vehicle data 11 of at least one automated driving vehicle while driving. The vehicle data 10, 11 comprise particularly at least a length of trip routes, and a respectively associated travel time, as well as values of a longitudinal acceleration.

The evaluation circuit 4 comprises a first module 4-1. The first module 4-1 is configured to determine a key performance indicator 20 based on the detected and/or obtained vehicle data 10, 11, and in determining the key performance indicator 20 to take into account both a travel time as well as an energy efficiency and/or emissions efficiency, and to provide the determined key performance indicator 20 as an evaluation result 30.

It may be provided that for driving data 10 of at least one human driver and/or for driving data 11 of at least one automated driving vehicle, determined key performance indicators 20, 21 are compared to one another, particularly in pairs, wherein a comparison result 31 is provided as an evaluation result 30. For this purpose, the evaluation circuit 4 may comprise a second module 4-2 and a third module 4-3. Like the first module 4-1, the second module 4-2 is configured to determine a key performance indicator 21 based on the detected and/or obtained driving data 11 of at least one human driver or at least one automated driving vehicle, and to take into account an energy efficiency and/or emissions efficiency in determining the key performance indicator 21. The third module 4-3 compares the determined key performance indicators 20, 21 to one another. Based on a comparative result, the third module 4-3 evaluates the driving behavior of an automated driving vehicle, for example, and provides the comparative result 31 as the evaluation result 30. For example, providing may comprise an outputting in the form of an analog or digital signal, for example in the form of a digital data packet. It may be provided that the determined key performance indicators 20, 21 are also provided, particularly output. Additional detector (not shown) may be provided for this purpose, with which the driving data 10, 11 may be detected.

It may be particularly provided that a sum of travel times of all trip routes taken into account is used as a measure for the travel time. It may be provided that a sum of all positive longitudinal accelerations on all trip routes taken into account is used as a measure for the energy efficiency and/or emissions efficiency. It may be provided that the travel time and the energy efficiency and/or emissions efficiency is weighted when taken into account for determining the key performance indicators. For example, the equation for determining the respective key performance indicators 20, 21 given in the general description may be used.

It may be provided that the key performance indicator 20, 21 is determined for various operational domains, and respectively provided as an evaluation result 30 dependent of operational domain. Even a comparative result 31 that is dependent upon operational domain may be provided as the evaluation result 30.

It may be provided that the detected driving data 10, 11, at least in part, are provided based on driving data 12 recorded during at least one historical real trip of at least one human driver and/or one automated driving vehicle.

It may be provided that the driving data 10, 11, at least in part, are detected during a real trip of at least one human driver and/or one automated driving vehicle.

It may be provided that the driving data 10, 11, at least in part, are detected during a simulation trip of the at least one human driver and/or the automated driving vehicle.

It may be provided that the device 1 for performing the simulation trips has a simulation apparatus 5. The simulation apparatus 5 may be parameterized with parameters determined particularly from real trips. The simulation apparatus 5 simulates particularly an environment of the vehicle and provides correspondingly simulated object lists from the environment and/or simulated sensor data. The human driver and/or the automated driving vehicle (i.e. the SDS) then drive in such a simulated environment of the vehicle, wherein the driving data 10, 11 are generated thereby.

It may be provided that a drive comfort is additionally taken into account in determining the key performance indicator 20, 21. This may take place, for example, by taking into account a longitudinal acceleration and/or a transverse acceleration as a measure for a driving comfort. For example, a mathematical expression may be selected for this, which in principle corresponds to the expression described in the general description with reference to the longitudinal acceleration in conjunction with the energy efficiency and/or emissions efficiency, wherein the transverse acceleration is additionally taken into account, or alternatively, the longitudinal acceleration is replaced by the transverse acceleration.

Figure 2:
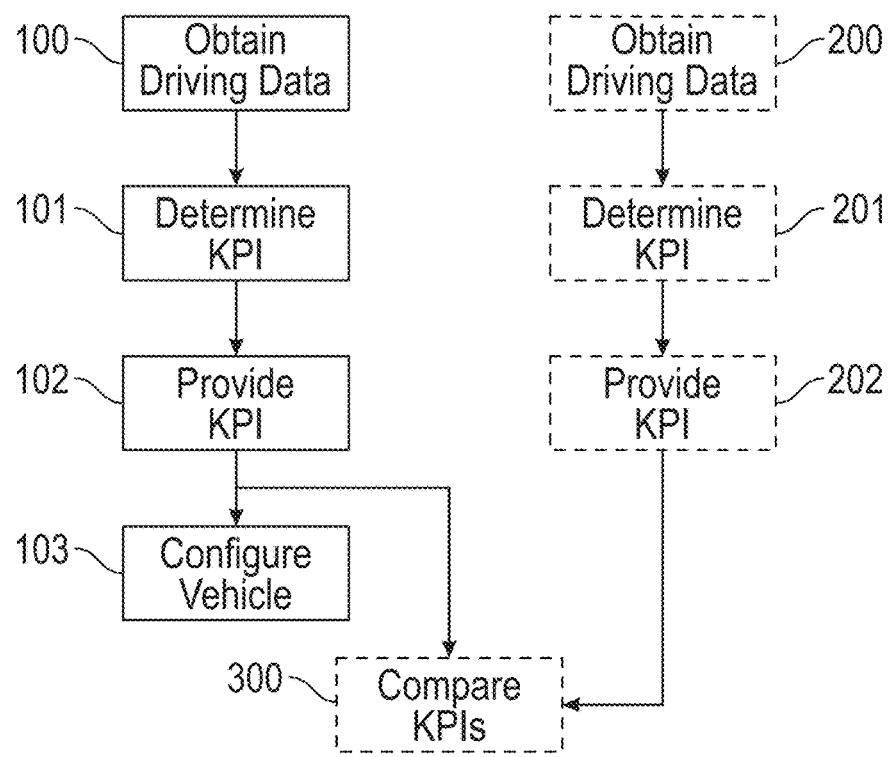
FIG. 2 shows a schematic flow diagram of an embodiment of the method for evaluating a driving behavior.

FIG. 2 shows a schematic flow diagram of an embodiment of the method for evaluating a driving behavior.

Detected driving data of at least one human driver and/or at least one automated driving vehicle are obtained in a measure 100.

Based on the obtained driving data, a key performance indicator is determined in a measure 101, wherein both a travel time as well as an energy efficiency and/or emissions efficiency is taken into account for determining the key performance indicator. The determination may take place in embodiments, such as have already been described with reference to FIG. 1.

In a measure 102, the determined key performance indicator is provided as an evaluation result, for example as an analog or digital signal, for example as a digital data packet.

It may be provided in a measure 103 that at least one automated vehicle (particularly an associated SDS) is configured based on the provided evaluation result. For example, the evaluation result may be compared to a threshold value. The configuration may be changed in dependence upon a comparison result. It may be particularly provided that at last one automated driving function is released and/or deactivated and/or configured with regard to a functional scope in dependence upon the (operational domain-dependent) evaluation result.

It may be provided that for driving data of at least one human driver and/or for driving data of at least one automated driving vehicle, determined key performance indicators are compared to one another, wherein a comparison result is provided as an evaluation result. For this purpose, the measures 100 to 102 are executed particularly for driving data of at least one automated driving vehicle, and the measures 200 to 202 are executed for driving data of at least one human driver, wherein the measures 200 to 202 correspond to the measures 100 to 102. In a measure 300, the respectively resulting key performance indicators are compared to one another, and a comparison result is provided as an evaluation result. This particularly makes it possible to evaluate the driving behavior of an automated driving vehicle (particularly an associated SDS) compared to a human driving behavior. However, it may also be provided that a driving behavior of automated driving vehicles (e.g., of different types and/or different states of development) may be compared to one another in this manner.

The measure 103 may also be executed after performing the measure 300. It may be particularly provided that at least one automated vehicle (particularly an associated SDS) is configured based on the comparison result provided as the evaluation result.

LIST OF REFERENCE NUMERALS

1 System
2 First detector
4 Evaluation circuit
4-1 First module
4-2 Second module
4-3 Third module
10 Driving data
11 Driving data
12 Recorded driving data
20 Driver key performance indicator
21 Vehicle key performance indicator
30 Evaluation result
31 Comparison result
100-103 Measures of the method
200-203 Measures of the method
300 Measure of the method The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for evaluating a driving behavior, comprising:

obtaining detected driving data of at least one human driver or detected driving data of at least one automated driving road vehicle;

determining a key performance indicator based on the obtained driving data, wherein both a) a travel time as well as b) an energy efficiency and/or emissions efficiency are taken into account in determining the key performance indicator; and providing the determined key performance indicator as an evaluation result; wherein the driving data, at least in part, are detected during a simulation trip of the at least one human driver and/or the automated driving vehicle.

2. The method of claim 1, comprising: comparing determined key performance indicators for driving data of at least one human driver and [/or] for driving data of at least one automated driving vehicle, wherein a comparison result is provided as an evaluation result.

3. The method of claim 1, wherein the key performance indicator is determined for various operational domains and respectively provided as an evaluation result dependent on an operational domain.

4. The method of claim 1, wherein a sum of travel times of all trip routes taken into account is used as a measure for the travel time.

5. The method of claim 1, wherein a sum of all positive longitudinal accelerations on all trip routes taken into account is used as a measure for the energy efficiency and/or emissions efficiency.

6. The method of claim 1, wherein the travel time and the energy efficiency and/or emissions efficiency is weighted when taken into account for determining the key performance indicator.

7. The method of claim 1, wherein the detected driving data are provided at least in part based on driving data recorded during at least one historical real trip of at least one human driver.

8. The method of claim 1, wherein the driving data, at least in part, are detected during a real trip of at least one human driver and/or one automated driving vehicle.

9. A system for evaluating a driving behavior, comprising:
a detector, and
an evaluation circuit,
wherein the detector is configured to detect and/or obtain vehicle data of at least one human driver while driving a vehicle, or vehicle data of at least one automated driving vehicle while driving,
wherein the evaluation circuit is configured to:
determine a key performance indicator based on the detected and/or obtained vehicle data, and in determining the key performance indicator to take into account both, a) a travel time as well as b) an energy efficiency and/or emissions efficiency, and to provide the determined key performance indicator as an evaluation result; wherein
the driving data, at least in part, are detected during a simulation trip of the at least one human driver and/or the automated driving vehicle.

10. The method of claim 2, wherein the key performance indicator is determined for various operational domains and respectively provided as an evaluation result dependent on an operational domain.

11. The method of claim 2, wherein a sum of travel times of all trip routes taken into account is used as a measure for the travel time.

12. The method of claim 3, wherein a sum of travel times of all trip routes taken into account is used as a measure for the travel time.

13. The method of claim 2, wherein a sum of all positive longitudinal accelerations on all trip routes taken into account is used as a measure for the energy efficiency and/or emissions efficiency.

14. The method of claim 3, wherein a sum of all positive longitudinal accelerations on all trip routes taken into account is used as a measure for the energy efficiency and/or emissions efficiency.

15. The method of claim 4, wherein a sum of all positive longitudinal accelerations on all trip routes taken into account is used as a measure for the energy efficiency and/or emissions efficiency.

16. The method of claim 2, wherein the travel time and the energy efficiency and/or emissions efficiency is weighted when taken into account for determining the key performance indicator.

17. The method of claim 3, wherein the travel time and the energy efficiency and/or emissions efficiency is weighted when taken into account for determining the key performance indicator.

18. The method of claim 4, wherein the travel time and the energy efficiency and/or emissions efficiency is weighted when taken into account for determining the key performance indicator.

19. The method of claim 5, wherein the travel time and the energy efficiency and/or emissions efficiency is weighted when taken into account for determining the key performance indicator.

* * * * *